United States Patent
Robison

(10) Patent No.: US 7,062,759 B2
(45) Date of Patent: *Jun. 13, 2006

(54) METHOD AND SYSTEM FOR INTERPROCEDURAL SIDE EFFECT ANALYSIS

(75) Inventor: Arch Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 717 days.

This patent is subject to a terminal disclaimer.

(21) Appl. No.: 09/839,910

(22) Filed: Apr. 19, 2001

(65) Prior Publication Data

US 2004/0015903 A1    Jan. 22, 2004

(51) Int. Cl.
  *G06F 9/45*    (2006.01)
(52) U.S. Cl. .................. 717/141; 717/155; 717/151; 717/154; 717/157; 717/141; 717/156
(58) Field of Classification Search ................ 717/159, 717/4, 160, 133, 140–161

See application file for complete search history.

(56) References Cited

U.S. PATENT DOCUMENTS

| | | | | |
|---|---|---|---|---|
| 5,485,616 A | * | 1/1996 | Burke et al. | 717/133 |
| 5,671,419 A | * | 9/1997 | Carini et al. | 717/145 |
| 5,790,866 A | * | 8/1998 | Robison | 717/160 |
| 6,173,444 B1 | * | 1/2001 | Archambault | 717/159 |
| 6,427,234 B1 | * | 7/2002 | Chambers et al. | 717/140 |
| 6,721,945 B1 | * | 4/2004 | Sinha | 717/157 |
| 6,820,253 B1 | * | 11/2004 | Robison | 717/141 |
| 2002/0010911 A1 | * | 1/2002 | Cheng et al. | 717/4 |

OTHER PUBLICATIONS

Hind et al., Interprocedural Pointer Alias Analysis, Jul. 1999, ACM.*
Cooper et al., Interprocedural Side-Effect Analysis in Linear Time, Jun. 1988, ACM.*
Cooper et al., The Impact of Interprocedural Analysis and Optimization in the Rn Programming Environment, 1986, ACM.*
Cheng et al., A Practical Interprocedural Pointer Analysis Framework, Apr. 1999, Univ. of Illinois.*
Atkinson et al., Effective Whole-Program Analysis in the Presence of Pointers, 1998, ACM.*
Lakhotia, Constructing call multigraphs using dependence graphs, 1993, ACM.*
Liu et al., Eliminating Two Kinds of Data Flow Inaccuracy in the Presence of Pointer Aliasing, 1997, IEEE.*
Harrold et al., Separate Computation of Alias Information for Reuse, 1996, IEEE.*
Boyer et al., Efficient Implementation of Lattice Operations, ACM, 1989.*

(Continued)

*Primary Examiner*—Kakali Chaki
*Assistant Examiner*—Insun Kang
(74) *Attorney, Agent, or Firm*—Blakely, Sokoloff, Taylor & Zafman LLP

(57) ABSTRACT

Interprocedural side-effect analysis is performed by constructing a fixed-point problem graph for each translation unit of a software program having a plurality of separately compilable components. The method performs analyzing each routine, of a software program having a plurality of separately compilable routines, to create a plurality of local side-effect problems for each routine; and merging the local side-effect problems to create a global side-effect problem.

18 Claims, 13 Drawing Sheets

OTHER PUBLICATIONS

Grove et al., Call Graph Construction in Object-Oriented Language, OOPSLA, 1997.*

Murphy et al., Program Analysis with Partial Transfer Functions, ACM, 2000.*

Hassan et al—Jan. 1989—Efficient Implementation of Lattice Operations—ACM Transactions on Programming Languages and Systems, vol. 11, No. 1, pp. 115-146.

* cited by examiner

| Fujnction | Fujnction (x,y) |
|---|---|
| 410 — TOP | (PURE,PURE) |
| 420 — COPY | (y,y) |
| 430 — IN_TO_LOST | if $y \leq I$ ⇒ (LOST,LOST)<br>otherwise ⇒ (PURE,PURE) |
| 440 — UNRETURN | |
| 450 — COPY_AND_IN_TO_LOST | if $y$=LOST⇒(LOST,LOST)<br>otherwise ⇒ $(z,z)$ where $z = y \sqcup OI$ |
| 460 — CAT_FORMAL | if $y \leq I$ ⇒ (LOST,LOST)<br>otherwise ⇒ (y,y) |
| 470 — CAT_ACTUAL | (y,PURE) |
| | (PURE,y) |
| 480 — GATE | if x=LOST⇒ (LOST,LOST)<br>else if x<R $(z,z)$ where $z = (x \sqcup OI) \sqcap y$<br>else$(z,z)$ where $z = (x \sqcup OI)$ |

Fig. 4A

```
// Translation unit #1 int* f( int* a, int* b, int n ) {
    int *c = a;
    if( n>0 ) {
        int* d = a+1;
        int* e = b+1;
        int* z = f( d, e, n-1 );
        c = z-1;
        *c = *b;
    }
    return c;
}
```

```
// Translation unit #2
extern int* f(int* a, int* b, int n );

void g( int* p ) {
    int y[10];
    f( &y[0], p, 10 );
}
```

| Translation Unit #1 | |
|---|---|
| Source line | Action |
| (entry into f) | Add [@a,-2] →[f,0] |
| | Add [@b,-2] →[f,1] |
| int *c = a; | Add [@c,-2] → [@a,-2] |
| n>0 | None |
| int *d = a+1; | Add [@d,-2] → [@a,-2] |
| int *e = b+1; | Add [@e,-2] → [@b,-2] |
| int* z = f(d,e,n-1) | Add [@z,-2] → [@0,-3] → [@d,-2] |
| | Add [f,0] → [@0,3] |
| | Add [@z,-2] → [@1,-3] → [@b,-2] |
| | Add [f,1] → [@1,3] |
| | Add [f,-1] → [f,-1] |
| c = z-1; | Add [@c,-2] → [@z,-2] |
| *c = *b; | Lower VAL[[@c,-2]] to O |
| | Lower VAL[[@b,-2]] to I |
| return c; | Lower VAL[[@c,-2]] to R |

| Translation Unit #2 | |
|---|---|
| Action | Action |
| int *p = &x[0]; | None |
| for( int i=0; i<10; i++) | None (no pointer assignments) |
| *p = i; | Lower VAL[[@p,-2]] to O |
| p=p+1 | None (edge omitted by self-loop rule) |
| c = z-1; | Add [@c,-2] → [@z,-2] |

FIG. 13

METHOD AND SYSTEM FOR INTERPROCEDURAL SIDE EFFECT ANALYSIS

FIELD OF THE INVENTION

This invention relates to computer software compilation systems, and more specifically to a compiler that performs interprocedural side-effect analysis.

BACKGROUND OF THE INVENTION

A well known technique used by conventional compilation systems is interprocedural analysis (IPA). IPA is a phase that is added to a compilation system to analyze an entire program and collect global information related to the translation units. Global information includes global variables and how the multiple translation units manipulate and reference the global variables. Once the global information is collected, it is then passed to the optimizer as part of the back end of the compilation system. Thus, when the optimizer optimizes a translation unit, the optimizer accesses this global information and performs additional and more aggressive optimization pertaining to global variables. IPA improves the efficiency of the generated object code by providing optimization at a global level, thereby improving the run-time performance of the executable program.

Existing IPA analysis defers analysis and optimization of a program until link time, at which time all translation units are effectively merged into one big aggregate translation unit, which is then analyzed and optimized. This means that if the programmer edits a single translation unit, the entire program must be recompiled.

Complex programs also interact with storage devices, by either reading out of or writing data into the device. The data is usually passed to the storage device through pointers. However, many pointers are used by the programmer, that are not used for writes or reads to or from storage devices. Knowing which pointers are used in what ways enables improved optimization, and better diagnostics about the program, such as use of storage locations that have not been initialized.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 4A illustrates the functions assigned to edges according to the present method and system.

FIG. 13 illustrates a pair of tables that lists each line of relevant source code and the corresponding actions to the graph of FIG. 12.

DETAILED DESCRIPTION

Figure 1:
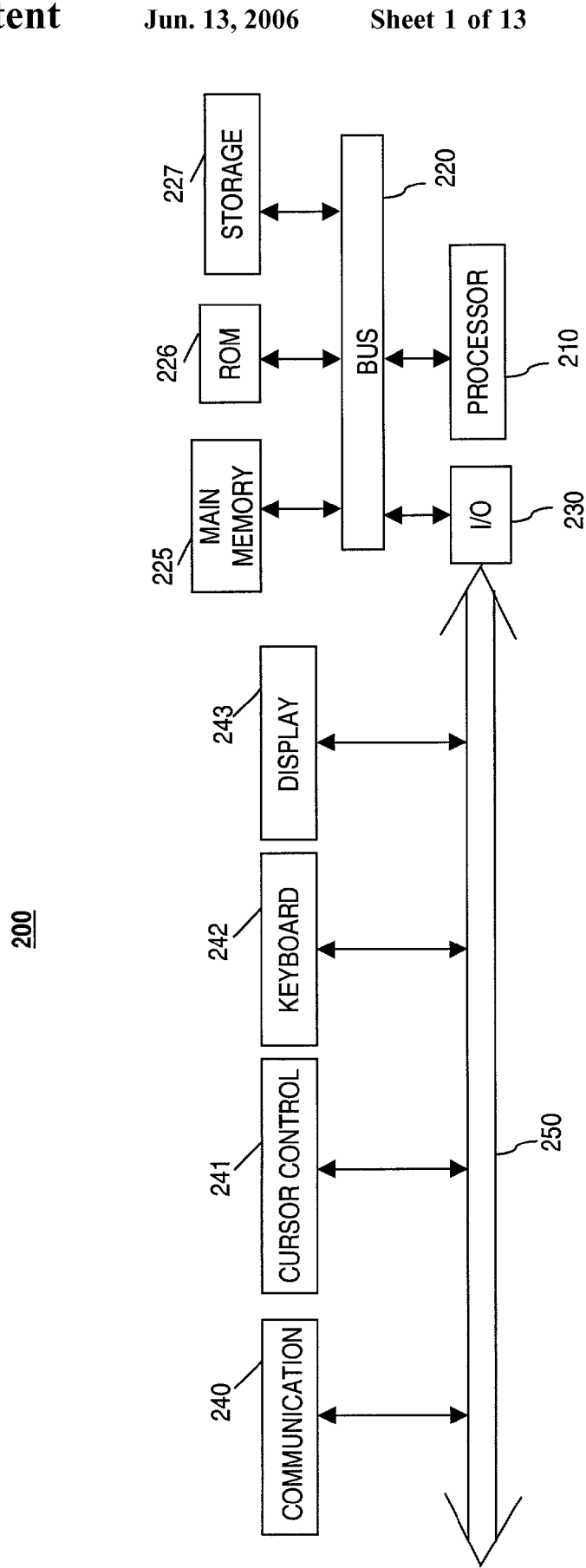
FIG. 1 illustrates a computer system representing an integrated multi-processor, in which elements of the present invention may be implemented.

A method and system for interprocedural side-effect analysis is disclosed. In one embodiment, the method is applied to a software program having a plurality of separately compilable components. The method performs analyzing each routine, of a software program having a plurality of separately compilable routines, to create a plurality of local side-effect problems for each routine; and merging the local side-effect problems to create a global side-effect problem.

A "side-effect" may be a reading or writing of storage by a routine. The method further comprises determining for each pointer parameter of a routine, whether that routine reads and/or writes storage via the parameter or a pointer derived from it. For each routine, the pointer parameters that might be used to derive the routine's return value are determined.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a computer system 200 representing an integrated multi-processor, in which elements of the present invention may be implemented. One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network. The communication device 240 may comprise a modem, a network interface card, or other well known interface device, such as those used for coupling to Ethernet, token ring, or other types of networks.

Figure 3:
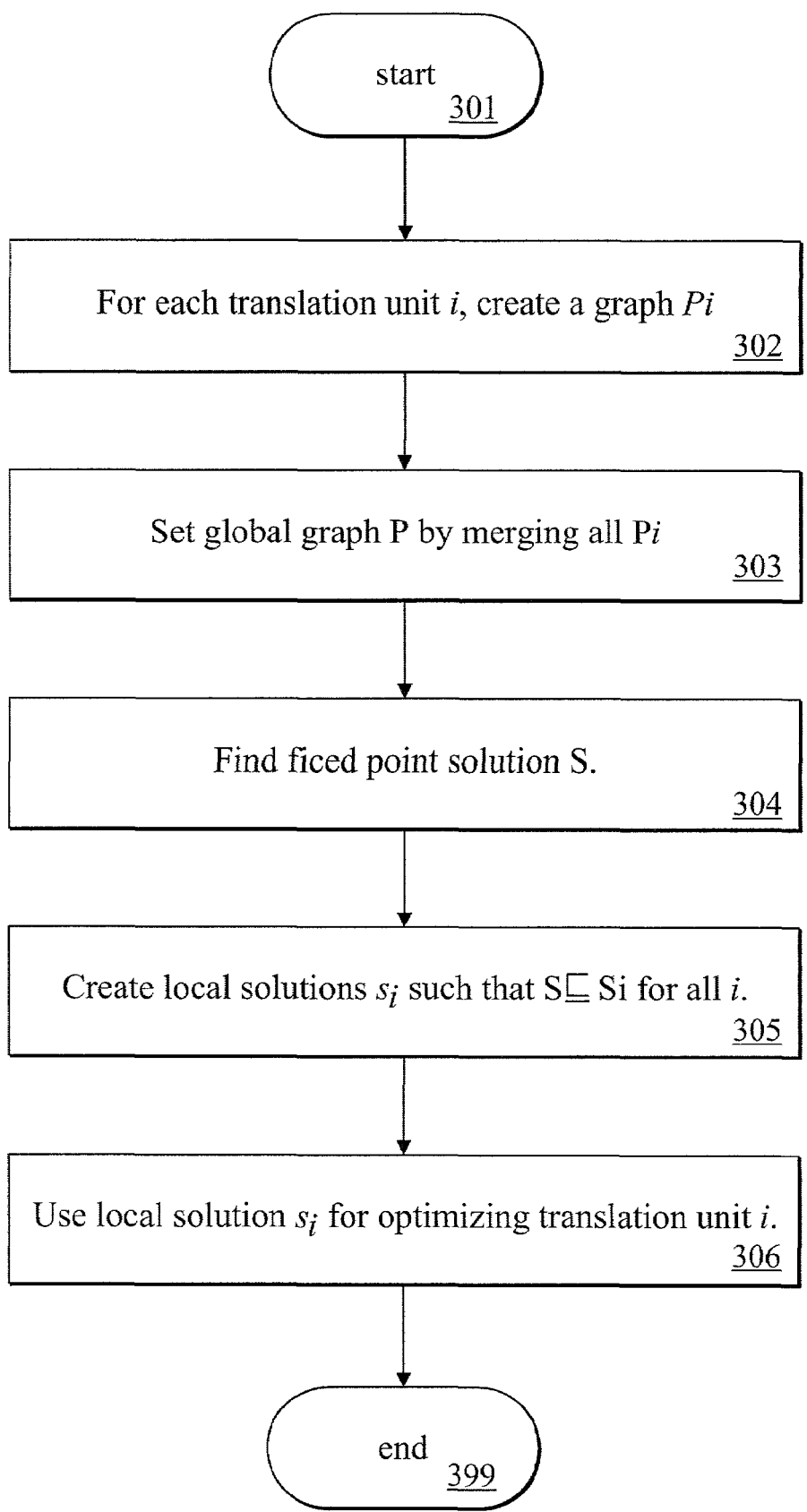
FIG. 3 illustrates an exemplary flow diagram of the techniques implemented by the present method.

The present system and method compute a lattice value associated with each pointer parameter in a program. The lattice 250 is shown in FIG. 3, which is a cube lattice with an extra value "LOST" 255 below it. The value "LOST" 255 is the bottom of the lattice. It denotes that the associated pointer value has been used in ways that were too complicated to track. The cube portion tracks three kinds of side effects associated with a pointer. Each is abbreviated by its initial letter:

"R" 280: a "return" effect, which means the pointer was returned by the routine;

"O" 285: an "out" effect, which is an indirect write via the pointer; and

"I" 290: an "in" effect, which is an indirect read via the pointer.

Values that represent a combination of effects are denoted by combining the initials. The value PURE 295 denotes the absence of any of the three effects, and is the top of the lattice. ROI 260 represents pointer parameters that have return, out, and in effects. RI 265 represents pointer parameters that have return and in effects. OI 270 represents pointer parameters that have out and in effects. RO 275 represents the combination of return and out side effects.

For example, the parameters to the C function "memcpy (dst,src)" map as follows:

dst→RO 275 src→I 295 because the parameter "dst" is used for writes, and is returned as the function's value, and the parameter "src" is used strictly for reads.

The description here uses the phrase "a value that may contain pointers". The meaning depends upon the rules of the source language. Usually, this check involves looking at the type of the value, and considering whether it is a pointer type or aggregate containing a pointer type. But some programs are "abusive" in the sense that they hide pointers inside integers. In this case, the check must be broadened to consider integral types as perhaps containing pointers.

FIG. 3 illustrates an exemplary flow diagram of the techniques implemented by the present method. The process commences at block 301. At processing block 302, let there be one or more translation units, each with a distinct label i. Each local compilation of a translation unit i creates a local problem p, for which a solution is of interest. The set of all possible problems must form a partial order, and the set of all possible solutions must form a partial order. A partial order is a relation, signified herewith by "⊑," that is transitive: x⊑y and y⊑z implies x⊑z.

reflexive: x⊑x is always true.

antisymmetric: (x⊑y) implies that either x=y or not(y⊑x)

For example, the relation "is a divisor of" is a partial order for positive integers. So is "less or equal" for integers. If each element is a set, then the relation "is a subset of" is a partial order. The ordering is "partial" because not all pairs of elements can be compared. For example, 2 is not a divisor of 3, nor vice-versa. When dealing with a partial order, for any two elements x or y, one of the following four situations hold:

x=y is true x⊑y is true but y⊑x is false y⊑x is true but x⊑y is false both x⊑y and y⊑x are false.

In the last case, we say the values are "incomparable".

The solutions must be a monotone function of the problems: for two problems p and p' with respective solutions s and s', then p⊑p' must imply s⊑s'. A function f that maps a lattice of values onto itself is monotone if x⊑y implies f(x)⊑f(y) for any two lattice elements x and y. The set of monotone functions over a lattice of values induce a lattice of functions, where f⊑g if and only if f(x)⊑g(x) for all lattice values x.

At processing block 303, the IPA solver creates a global problem P such that P⊑$p_i$ (for all i). At processing block 304, a global solution S is computed to the global problem then local solutions $s_i$ are created such that $s_i$⊑S (for all i) at processing block 305. Each local solution $s_i$ is used to optimize the ith translation unit at processing block 306. The present process ends at block 399.

Typically, the partial orders are lattices. A lattice is a partial ordering closed under the operations of a least upper bound and a greatest lower bound. Lattices are a standard part of discrete mathematics.

The "meet" of a set of elements is an element that is less or equal to every element in the set. For example, let "⊑" denote "is a divisor of". Then given {12,24,30}, the join is 6, because 6 is a divisor of each element in the set, and there is no larger divisor. 3 is a lower bound (divisor), but since it is a divisor of 6, is not the greatest. The "join" is an element that is greater or equal to every element in the set. For "is a divisor of", the "join" is simply the least common multiple. Closed means that the bounds exist in the set under discussion. For example, if the set were composite (non-prime) numbers only, then the meet of {12, 15} (which is 3) would not be in the set.

The "top" of a lattice is the element that is the join for the set of all elements; the "bottom" is the meet for the set of all elements. (Thus "top" and "bottom" are the identity elements for "meet" and "join" respectively.) E.g., infinity is the top of the divisor lattice; and 1 is the bottom of said lattice.

If so, then the global problem P is the lattice-meet of all $p_i$ and each local solution is chosen such that S is the lattice-join of all $s_i$.

Each vertex v is labeled with an ordered pair [r,k], where r is either the name of a routine or an anonymous symbol. Anonymous symbols are denoted here by @x, where x is the name of the corresponding variable/routine, or some unique integer for sake of distinguishing it from other anonymous symbols. Anonymous symbols represent routines and variables that cannot be seen directly outside their respective translation units. The values for anonymous vertices are not needed, because their values can be computed from boundary information. The value k is an integer such that k≧−3. The notation INDEX(v) denotes the k in the label [r,k] of a vertex v.

There are four kinds of vertices in the graphs. The first kind represents formal parameters. There is a different one for each formal parameter of a routine that might contain pointers. Each such vertex is labeled with an ordered pair [r,k], where r is the name of the routine, and k is the (zero-origin) ordinal position of the parameter. E.g., the parameters to the C routine "memcpy" are labeled:

[memcpy,0]

[memcpy,1]

The last parameter to memcpy does not have a corresponding vertex because it is an integer that cannot contain a pointer value. If we are permitting abusive programs, then there would have to be a vertex [memcpy,2] also. If the routine has internal linkage (is not visible to other translation units), then r is an anonymous symbol.

The second kind of vertex is for implicit parameters. Each routine is considered to have an implicit parameter, which represents an imaginary pointer to any storage read or written by the routine that is not local to the routine and the read or write is not via a pointer derived from a parameter of the routine. E.g., writes to the variable "errno" by the C math routine "sqrt". Here, "local to the routine" means that it is lexically visible only inside the routine and has a lifetime extending only over the invocation of the routine. E.g., register and auto variables are considered local to a routine (even if their address is passed out of the routine), but file scope and local static variables are not considered local to the routine. Each implicit parameter is labeled with an ordered pair [r,−1], where r is constructed from the same rules as for formal parameters.

The third kind of vertex represents a local variable of a routine that might contain a pointer. Such vertices are labeled [r,−2], where r is always an anonymous symbol unique to each variable. The reason it is always anonymous is that the corresponding variable is never lexically visible outside its routine. The local variables considered include variables representing formal parameters.

The fourth kind of vertex, called a "gate vertex", represents the binding of an actual parameter that might contain a pointer to a formal parameter at a call site. Such vertices are labeled [r,−3], where r is always an anonymous symbol, unique to the vertex. For a call site with n parameters that may contain pointers, there are n such gate vertices, one for each parameter.

The following table summarizes the vertex labels:

| | |
|---|---|
| [r, k] where k ≧ 0 | kth formal parmeter |
| [r, −1] | Implicit parameter |
| [r, −2] | Local pointer variable |
| [r, −3] | Gate for formal/actual binding |

Figure 2:
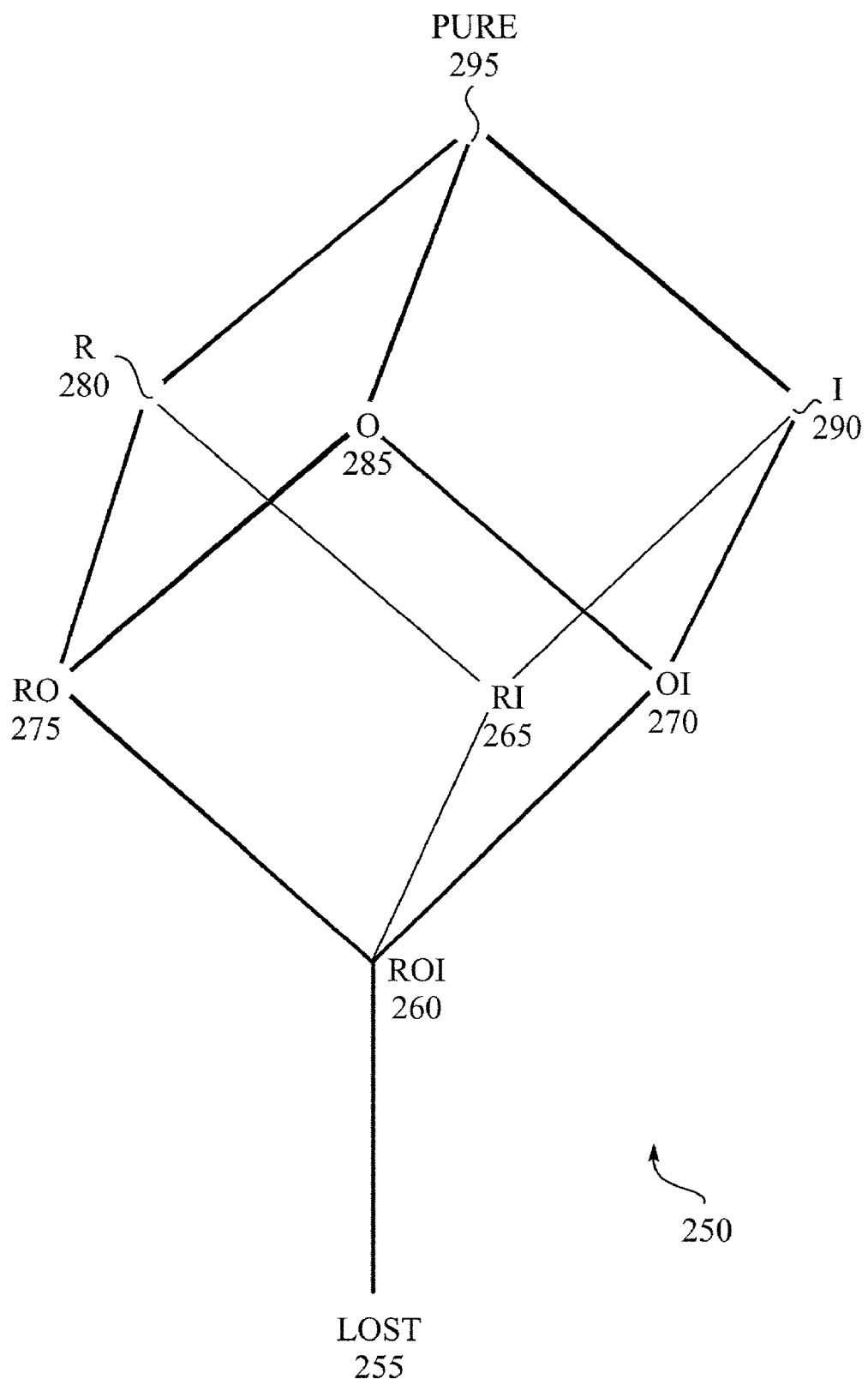
FIG. 2 illustrates an exemplary cube lattice with an extra value "LOST" below it.

The lattice values associated with a vertex v are denoted VAL[v]. These values are not taken from the lattice from FIG. 2, but from the Cartesian product of that lattice with itself, henceforth called the "square lattice". E.g., each vertex has an associated value of the form (formal,actual), where formal and actual are each drawn from the lattice in FIG. 2. The usual rule for ordering Cartesian pairs applies here: $(x_1,y_1)$⊑$(x_2,y_2)$ if $x_1$⊑$x_2$ and $y_1$⊑$y_2$. Here, "⊑" denotes the partial order of the lattice. The "formal" portion pertains to gate vertices and edges incident to it, and otherwise is irrelevant. By convention, when irrelevant, it is a copy of the "actual" portion.

Each edge u→v in the graph has an associated transfer function, denoted FUN[u→v]. These functions represent implications of the form "if the tail has some property, then the head has some property". FIG. 4A shows the functions assigned to edges according to the present method and system. The present method may use these functions and all others generated from these by closure under composition and function-meet as described above. Each function in FIG. 4A represents an implication. These implications are attached to edges of a graph built by the invention. The left column gives the names of the functions. The right column defines the function.

TOP 410 is the function that implies nothing. TOP(x,y) is always (PURE,PURE). It implies nothing because PURE is the identity element of the value lattice shown in FIG. 2.

Figure 4B:
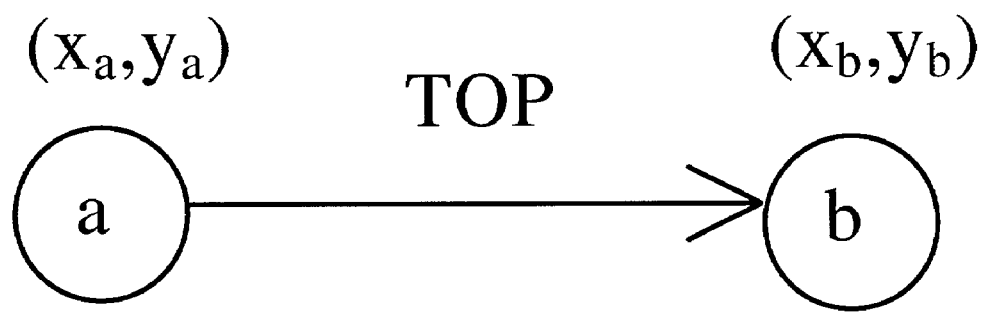
FIG. 4B illustrates two vertices, their values, and the transfer function TOP 410 between them.

That is, PURE⊓z=PURE for any possible value z. FIG. 4B illustrates two vertices, their values, and the transfer function TOP 410 between them.

When the fixed-point problem for the graph is solved, the edge shown enforces the constraint $(x_b,y_b) \sqsubseteq TOP(x_a,y_a)$, which is to say $(x_b,y_b) \sqsubseteq (PURE,PURE)$. By the usual rule for Cartesian product ordering, this is a way of saying $x_b \sqsubseteq PURE$ AND $y_b \sqsubseteq PURE$. Formally, the rule for partial ordering of Cartesian pairs is $(a,b) \sqsubseteq (x,y)$ if and only if $a \sqsubseteq x$ and $b \sqsubseteq y$.

Since PURE is the highest value in the lattice, the constraints say nothing. The only reason for defining TOP is that it is used to initialize variables that are used to accumulate the meet of values. (Just as we start with 0 if accumulating a sum.) It's called TOP because it's the top of a lattice-of-functions induced by the lattice of values.

COPY 420 is the function that implies a straightforward "cannot exceed". COPY(x,y)=(y,y). It's normally used in contexts where only the rightmost element of each pair is of significance. It could just as well be defined as COPY(x,y)= (random junk,y), but for sake of simplicity, the convention is followed that the leftmost element of a pair is made equal to the rightmost element.

An edge implies the constraint $(x_b,y_b) \sqsubseteq COPY(x_a,y_a)$, which is to say $(x_b,y_b) \sqsubseteq (y_a, y_a)$. That is, the rightmost element in the value pair for vertex b cannot exceed the rightmost element in the value pair for vertex a. The constraint on the leftmost element is strictly a corollary of our conventions.

The name COPY comes from the fact that the function is used to model the effects of a simple pointer-copying operation. For example, given a pointer assignment "A:=B", then if the value in pointer A is used for an indirect read or write, then so is the value in pointer B. When a pointer B is marked with a lattice value such as OI, the pointer's value is used for "write" and "read" somehow. It may be that the pointer variable itself is not used directly for an indirect "write" or "read" but merely copied to some other variable that is used for the indirect "write" or "read".

IN_TO_LOST 430 is the function that does the implications for assignments of the form "A:=&B". If a value A is used for an indirect read, the value read will be the address of B. We don't know how this value that was read will be later used. For example, it could be used to read or write the target of B, such as in: "A:=&B; **A= . . . ". The present system and method does not try to track multilevel indirections, so the worst case (LOST) is presumed. Hence the transfer function that maps reads to LOST, but otherwise returns the trivial constraint (really a non-constraint) of PURE. The doubling (,) is simply an artifact of the previously mentioned convention where only the rightmost element really matters.

UNRETURN 440 is a function that expresses an implication similar to COPY, except that any "return" (R) effects are stripped. Or, stated another way, O and I effects (and "completely LOST") effects only are propagated. It's used to propagate constraints from callees to callers. Because a callee returns a value to its caller does not imply that the caller returns it to it's own caller. I.e., the "return" (R) effect is interpreted relative to the routine in which the pointer lives, and must be stripped when propagating constraints across contexts.

COPY_AND_IN_TO_LOST 450 is merely COPY⊓ IN_TO_LOST, where the meet is the "function-meet". So it's defined as COPY_AND_IN_TO_LOST (x,y)=COPY(x,y)⊓IN_TO_ LOST(x,y)

If IN_TO_LOST returns (LOST,LOST), which is the bottom of the lattice of Cartesian pairs, then trivially the meet is also the bottom, (LOST,LOST). If IN_TO_LOST returns (PURE,PURE), which is top of the lattice of Cartesian pairs, then trivially the meet returns the other argument, COPY(y,y). I.e., IN_TO_LOST always returns the "zero element" or "identity element" for the meet operation. So we can simplify to:

if $y \sqsubseteq I \Rightarrow (LOST,LOST)$; otherwise $\Rightarrow (y,y)$

Figure 10:
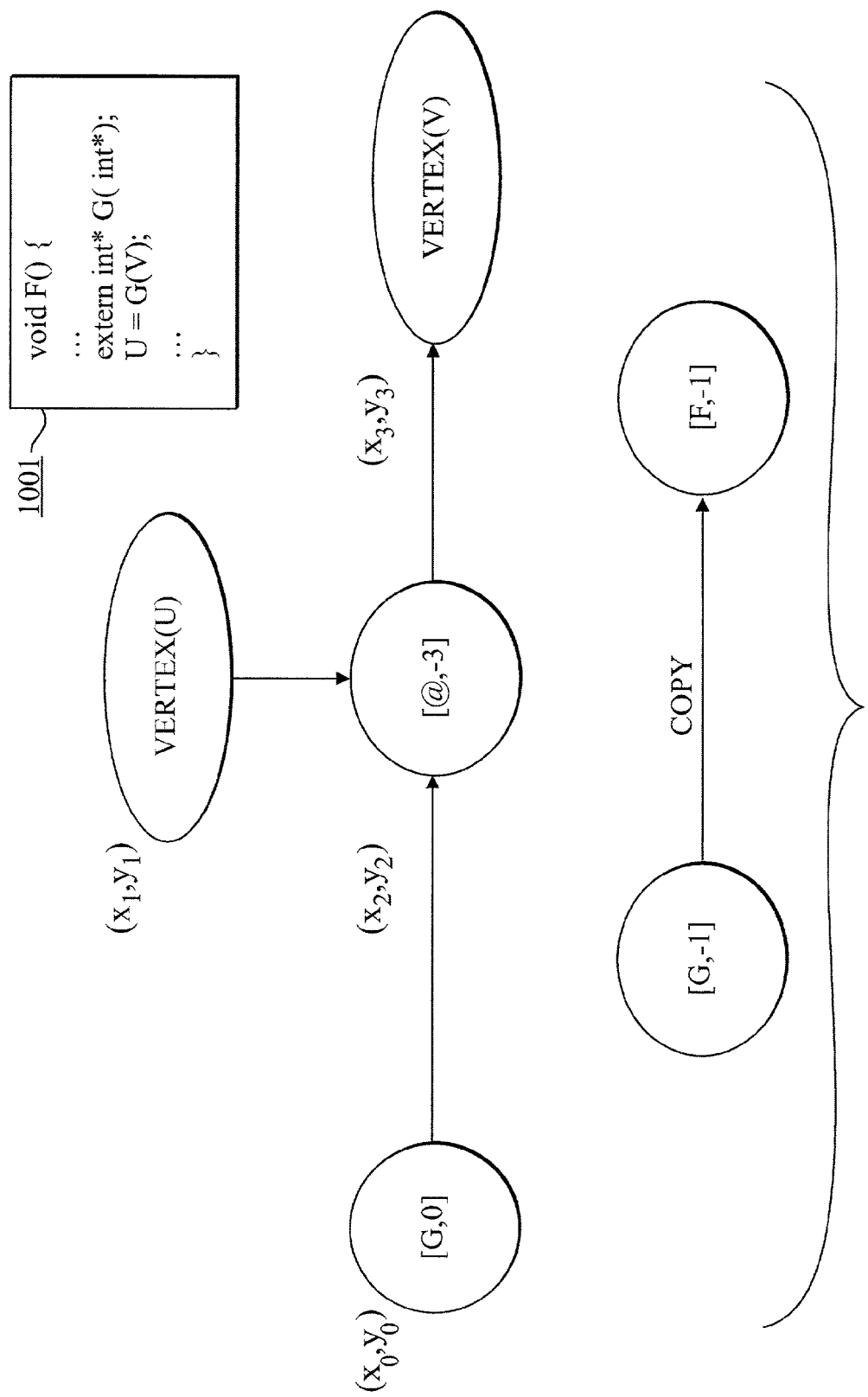
FIG. 10 illustrates a sample fragment of code, and the corresponding subgraph generated from it.

CAT_FORMAL 460 and CAT_ACTUAL 470 are used to merge two lattice values into a Cartesian pair. An edge with CAT_FORMAL (as shown in FIG. 10) implies these constraints:

$(x_2,y_2) \sqsubseteq CAT\_FORMAL(x_0,y_0)$ which after substituting the definition of CAT_FORMAL becomes:

$(x_2,y_2) \sqsubseteq (y_0,PURE)$ which after applying the rule for Cartesian pairs becomes two constraints:

$x_2 \sqsubseteq y_0$ $y_2 \sqsubseteq PURE$

The second constraint is a tautology (trivially true).
CAT_ACTUAL (as shown in FIG. 10) implies:

$(x_2,y_2) \sqsubseteq CAT\_ACTUAL(x_1,y_1)$ which after substitution is $(x_2,y_2) \sqsubseteq (PURE,y_1)$ which after applying the rule for Cartesian pairs becomes $y_2 \sqsubseteq y_1$ $x_2 \sqsubseteq PURE$ The second constraint is a tautology (trivially true).
So the non-trivial constraints for the value $(x_2,y_2)$ are:

$x_2 \sqsubseteq y_0$ $y_2 \sqsubseteq y_1$

The solution that will be found when solving for the fixed-point solution (middle step 304 in FIG. 3) is:

$x_2 = y_0$ $y_2 = y_1$

That is, is a way of assigning $(x_2,y_2):=(y_0, y_1)$.

GATE 480 is the transfer function that propagates effects backwards through a callee (the routine called at a call site). Though FIG. 10 shows that the constraint is GATE($x_2, y_2$), remember that as proven earlier, $(x_2, y_2)=(y_0,y_1)$, so we're really talking about GATE($y_0, y_1$). Only the rightmost component of the result of GATE is of real interest.

In FIG. 4A, there are three cases considered for GATE. The first case is (after substituting $(x,y)=(x_2, y_2)=(y_0, y_1)$):

if $y_0 = LOST \Rightarrow (LOST,LOST)$

If $y_1 = LOST$, this means that the formal parameter's value was lost. Since the actual parameter is bound to this formal parameter, (in FIG. 10) V's value is lost. Hence the implication above.

The second case is ((after substituting $(x,y)=(x_2, y_2)=(y_0, y_1)$):

else if $y_0 \sqsubseteq R \Rightarrow (z,z)$ where $z=(y_0 \sqcup OI) \sqcap y_1$ If $y_1 \sqsubseteq R$, that means that the formal parameter has a "return" effect on it. This means that the value returned by function F (in FIG. 10) is the value of the formal parameter, or a minor variation on it per the BASE mapping discussed later. This means that effects on the value in U imply similar effects for the value in the actual parameter (V in FIG. 10) that was bound to the formal parameter. The expression ($y_0$⌐OI) simply says "strip the R effect from $y_0$". That's because an R effect in (z,z) means "returned from F"; the R effect in $y_0$ means "returned from G", because it's for an entity of G. I.e., it's the issue is the UNRETURN processing discussed earlier. The part "⌐$y_1$" says to include any effects on (U). The return effect has to be stripped first before doing this because there might be a return effect on U, which must be propagated backwards to V (if F returns the value of U, then it returns the value of V).

The third case is else (z,z) where z=($y_0$⌐OI)

At this point, $y_0$ does not have a "return" (R) effect on it. So the actual parameter V goes into G but does not come out. So the effects on V are precisely those $y_0$ on the formal parameter, except for return effects on the formal parameter (hence the "⌐OI").

Figure 5:
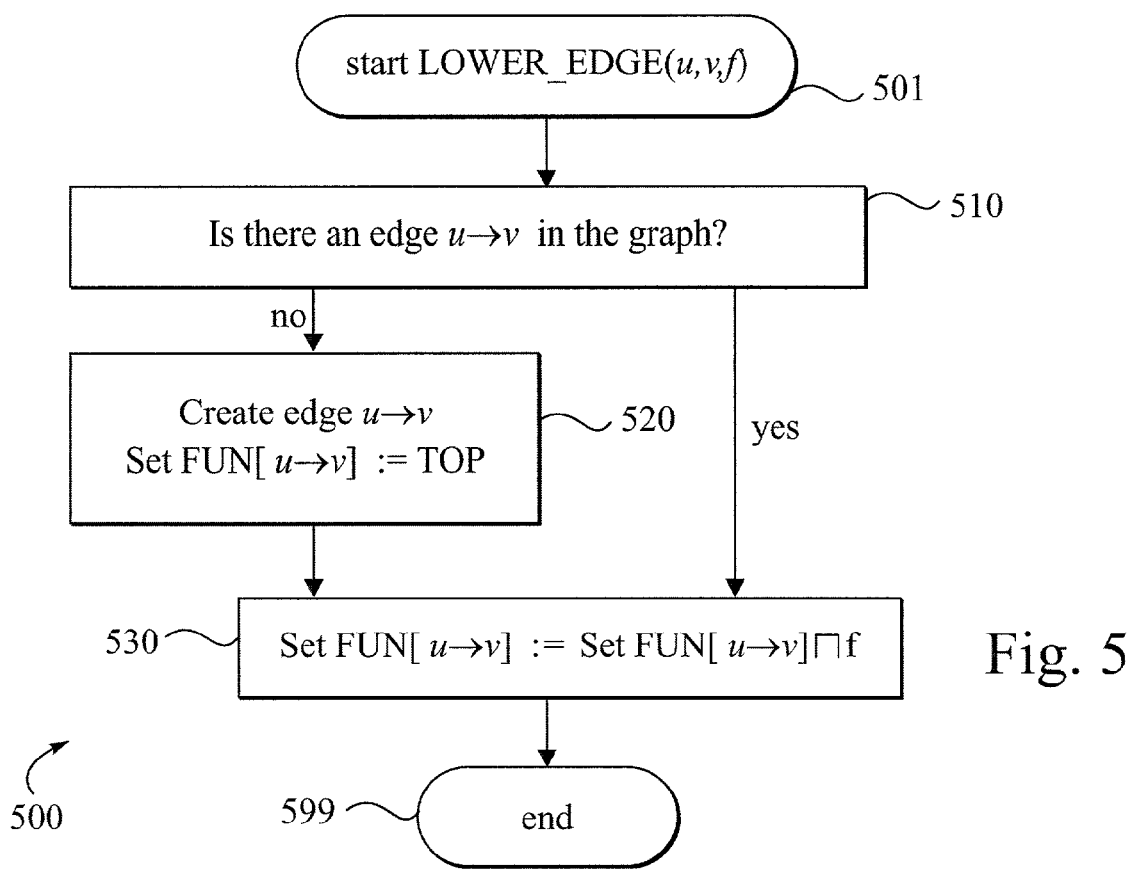
FIG. 5 illustrates a flow diagram of an exemplary method LOWER_EDGE, which is a method for asserting an implication between values of a vertex u and a vertex v.

FIG. 5 shows method LOWER_EDGE 500, which is a method for asserting an implication between a vertex u and a vertex v by possibly adding an edge u→v (if there is not already one present) and making the transfer function on u→v reflect the worst-case implications of the program so far analyzed. LOWER_EDGE method 500 starts at block 501. At decision block 510, the method determines if there is an edge u→v in the graph? If an edge does not exist, flow continues to processing block 520, where the edge's transfer function is set to TOP 410. Otherwise, if an edge does exist, flow continues to processing block 530, where the edge's transfer function is set to the most optimistic bound that is below its current transfer function and function "f". The method 500 ends at block 599.

Figure 6:
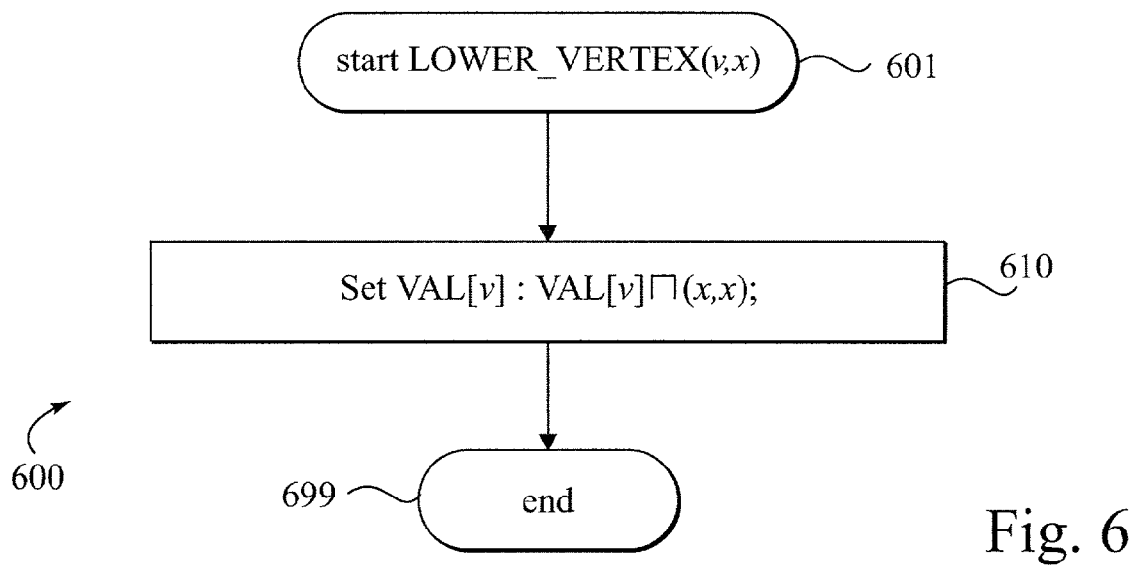
FIG. 6 illustrates a flow diagram of an exemplary method LOWER_VERTEX, which is a method used when the transfer function is a constant function.

FIG. 6 shows method LOWER_VERTEX 600, which is similar to LOWER_EDGE 500, but used where the value of the tail is irrelevant, i.e., the transfer function would be a constant function. LOWER_VERTEX 600 starts at block 601. The method 600 sets the value associated with vertex v to the meet of its old value and a lattice value x at processing block 610. The method 600 ends at block 699.

Figure 7:
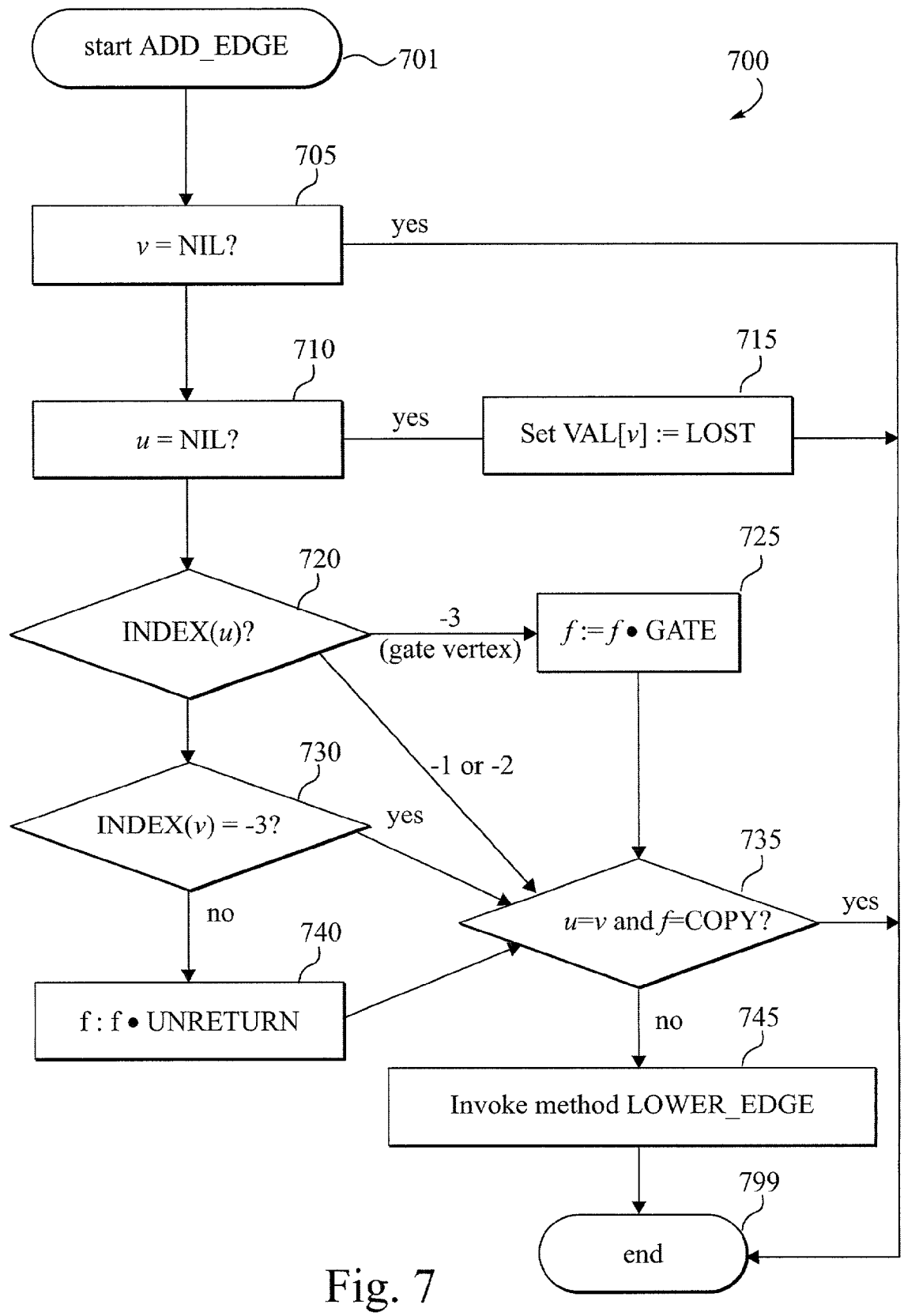
FIG. 7 illustrates a flow diagram of an exemplary method ADD_EDGE, which updates the problem graph to account for an assignment of the form "U:=V".

FIG. 7 shows method ADD_EDGE 700, which updates the problem graph to account for an assignment of the form "U:=V". Before invoking the method, the invention maps the left side U onto a vertex u, and the right side V onto a vertex v (using the function VERTEX discussed later). The method 700 begins at block 701. The special vertex "NIL" in decision block 705 represents "don't really know", and the mapping is allowed to punt by using this value. The fundamental intuition is that given an assignment "U:=V, if the value of U is used later as a pointer for a read or write (or is returned by the routine), then a similar effect happens to the value of V. Most commonly, the edge u→v with transfer function COPY is added to reflect this fact. But a few situations require more care. If v is NIL, we have already resigned ourselves to "don't really know" about V, and there's no point in adding an implication; so flow ends at block 799. If v is not NIL, then flow continues to decision block 710. If u is NIL, then we must presume the worst about U, and consequently the worst about v, and thus set VAL[v]:=LOST at processing block 715. If u is not NIL, then flow continues to decision block 720. If the vertex u is a "gate vertex", with index K=-3, flow continues to processing block 725. Vertex u is treated as if it were split into a hypothetical edge "$u_0$→$u_1$", such that $u_0$ is the head of all edges with head $u_0$ and $u_1$ is the tail of all edges with tail u. The transfer function on the hypothetical edge is GATE. The reason for making the edge hypothetical is simply to reduce the size of the graph. It could be made explicit. If vertex u is a formal parameter vertex, flow continues to decision block 730. At decision block 730, if the vertex v is a gate vertex with index K=-3, flow passes to decision block 735. This avoids stripping return effects of a GATE 480 vertex. If vertex v is not a GATE vertex, then flow continues to processing block 740. Vertex u is treated as if it were split into a hypothetical edge "$u_0$→$u_1$" similarly to the situation for a "gate vertex", except here the transfer function on the implicit edge is UNRETURN. Flow continues to decision block 735. If u=v and the transfer function is COPY, then the edge is a self-loop that adds no information and flow ends at block 799. Omitting such useless edges reduces the size of the graph. If u does not equal v or f does not equal COPY 420, flow continues to processing block 745, where method 500 is invoked. The process ends at block 799.

For an expression p, the notation BASE(p) is defined by these rules:

if p is an expression of the form q+offset, or a cast of the form (T)q, or is a projection operator (e.g. extracts bits) on q then BASE(p)=BASE(q) otherwise BASE(p)=p.

Conditional expressions are presumed to have been broken into simpler assignments. For an expression p, the notation VERTEX(p) denotes the vertex corresponding to the expression. It is defined as follows. If BASE(p) denotes a local variable, then VERTEX(p)=BASE(p). Otherwise VERTEX(p)=NIL.

Figure 8:
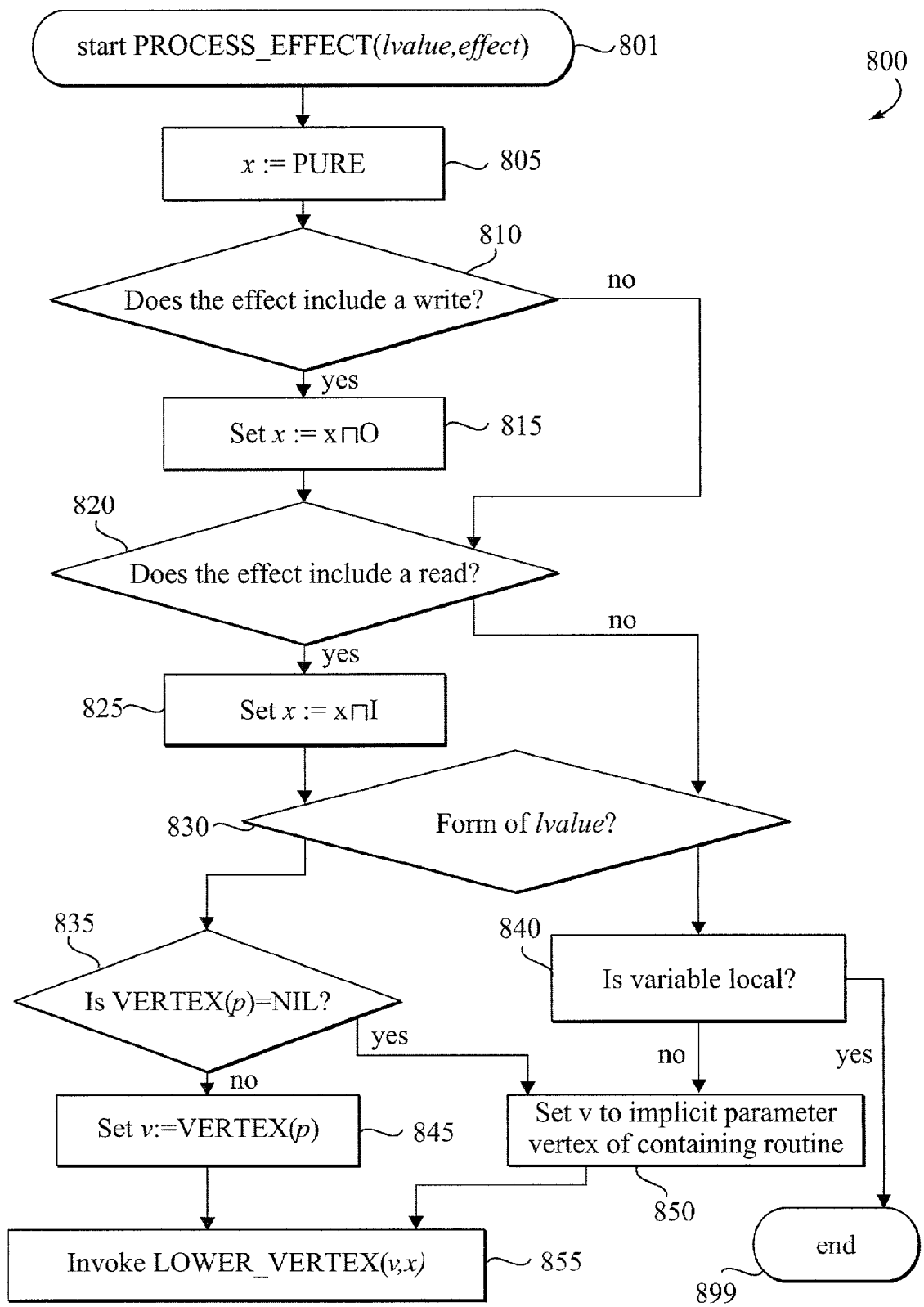
FIG. 8 illustrates a flow diagram of an exemplary method for reads and writes of non-local storage, PROCESS_EFFECT.

The local problem graph for a translation unit is built in a single pass over each instruction in a translation unit. Each instruction is analyzed for the possible implications that it introduces into the problem graph. The implications arise from reads or writes of non-local storage, and from pointer assignments. FIG. 8 is a flow graph showing the processing of reads and writes of non-local storage, PROCESS_EFFECT 800. The reads or writes are translated to the corresponding I and O effects. PROCESS_EFFECT 800 starts at block 801. Flow continues to process block 805, when the lattice value x is initialized to the value PURE 295.

At decision block 810, the instruction or effect is analyzed to determine if it includes a write. If it includes a write, flow continues to processing block 815, where lattice value x is assigned a value of O 285. Otherwise, flow continues to decision block 820, where the effect is analyzed to determine if it includes a read. If it includes a read, flow continues to processing block 825, where x is assigned a lattice value of I 290. Otherwise, flow continues to decision block 830.

At decision block 830, the form of lvalue is determined to be a variable or indirect. If a variable, flow continues to decision block 840. If the variable is local, flow ends and block 899. If the variable is not local, then flow passes to processing block 850, where vertex v is set to the implicit parameter vertex of the routine. Flow continues to processing block 855, where method LOWER_VERTEX 600 is invoked. Flow then ends at block 899.

If the form of lvalue 830 is indirect, then flow continues to decision block 835. If VERTEX (p)=NIL, then flow continues to processing block 850, and continues as described above. If VERTEX (p) does not equal NIL, flow continues to processing block 845, where v is set to VERTEX (p). Given a read or write via a pointer residing in local variable p, the present method invokes method LOWER_VERTEX(VERTEX(p),effect), 600 at processing block 855 unless VERTEX(p)=NIL, in which case use the vertex for the "implicit parameter" is used instead. Flow ends at block 899. Indirections through expressions more complicated than a local variable are presumed to have been broken up into an assignment to a temporary p followed by indirection via p, or at least analyzed as if such a transform had occurred. Reads and writes for global variables are treated as indirections via the "implicit parameter".

Figure 9:
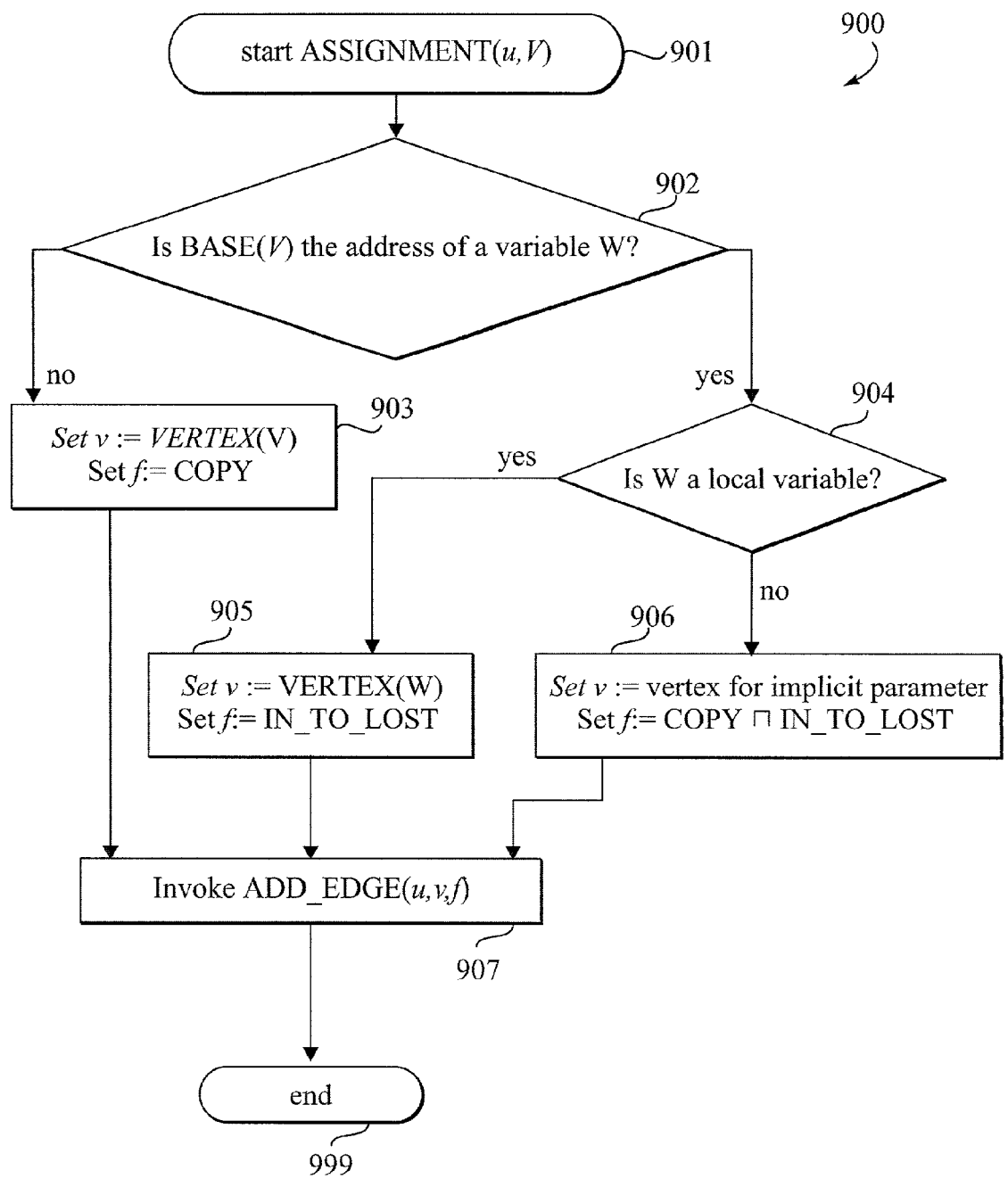
FIG. 9 illustrates a flow diagram of an exemplary method for assignments of the form "U:=V" handled by invoking method ASSIGNMENT(VERTEX(U), V).

FIG. 9 illustrates an exemplary flow chart of assignments of the form "U:=V" handled by invoking method ASSIGNMENT(VERTEX(U),V) 900. The method begins at block 901. Decision block 902, detects a special case if V is the address of a variable, say W In this case, an "IN" effect on U implies that the address of the variable W was copied somewhere, and we presume that the address is used for unknown purposes. Flow continues to decision block 904, where if variable W is non-local, flow continues to processing block 906, where effects via U imply effects on the "implicit parameter". If variable W is local, flow continues to processing block 905, where vertex v is set to VERTEX(w) and its transfer function is set to IN_TO_LOST 430.

Flow continues to processing block 907, where ADD_EDGE 700 is invoked and flow ends at block 999. If BASE(v) is not the address of variable W, then flow continues from decision block 902 to processing block 903. Vertex v is set to VERTEX(v) and the transfer function f is set to COPY 420. Flow continues to processing block 907 and continues as described above.

Processing a call site is the tricky part. If the callee is unknown (i.e. an indirect call), then LOWER_VERTEX(v, LOST) is invoked where v is the implicit parameter vertex for the caller, and we do likewise for each vertex corresponding to an actual argument. If the callee is known, any effects of the callee to its implicit parameter similarly affect the implicit parameter of the caller, hence the ADD_EDGE ([callee,-1],[caller,-1],COPY) is invoked to account for this. If the call does not assign the result, then the binding of the kth formal argument to an expression V is done by invoking ASSIGNMENT([callee,k],V). If the call returns a value and assigns the result somewhere, say T, the processing of bindings is more complicated, because if the result was calculated from a formal parameter, any effect on T must be propagated back to the corresponding actual argument. This implication depends upon two inputs: whether the callee returns a value based on a formal parameter, and on the future uses of the value assigned to T Such cannot be modeled by a single edge. In principle, we could model this with a hyperedge, but that would introduce burdensome complexity, so instead, we model a virtual hyperedge with an extra vertex and three edges. The situation is as shown in FIG. 10, which shows a sample fragment of code 1001, and the corresponding subgraph generated from it. The transfer functions CAT_FORMAL 460 and CAT_ACTUAL 470 act to merge information about effects on the formal parameter and actual destination of the callee's result. So if the lattice values on the corresponding vertices are $(x_0,y_0)$ and $(x_1,y_1)$ respectively, the value at the "gate" vertex becomes $(y_0,y_1)$ as previously discussed. Then the GATE 480 transfer function acts on this value to deduce the effects (lattice value $(x_3,y_3)$) on the corresponding actual argument. The fourth edge with transfer function COPY 420 deals with the previously discussed implication for the implicit parameters of the callee and caller.

There are also a few pointer assignments implied by entry into and return from a routine g. When processing a routine g, the entry into it is accounted for as follows. Each formal parameter is inspected. If the kth formal parameter (indices starting at 0) might contain a pointer, then an edge VERTEX [$var_k$]→(g,k) is added, where $var_k$ is the kth local parameter variable. Also, each return instruction that returns a value is inspected. If the instruction is of the form "return V", where V is an expression that might contain a pointer, then LOWER_VERTEX(VERTEX(BASE(V)),R) is invoked. I.e., a return effect (R 280) is added.

Figure 11:
FIG. 11 illustrates an exemplary program segment.
Figure 12:
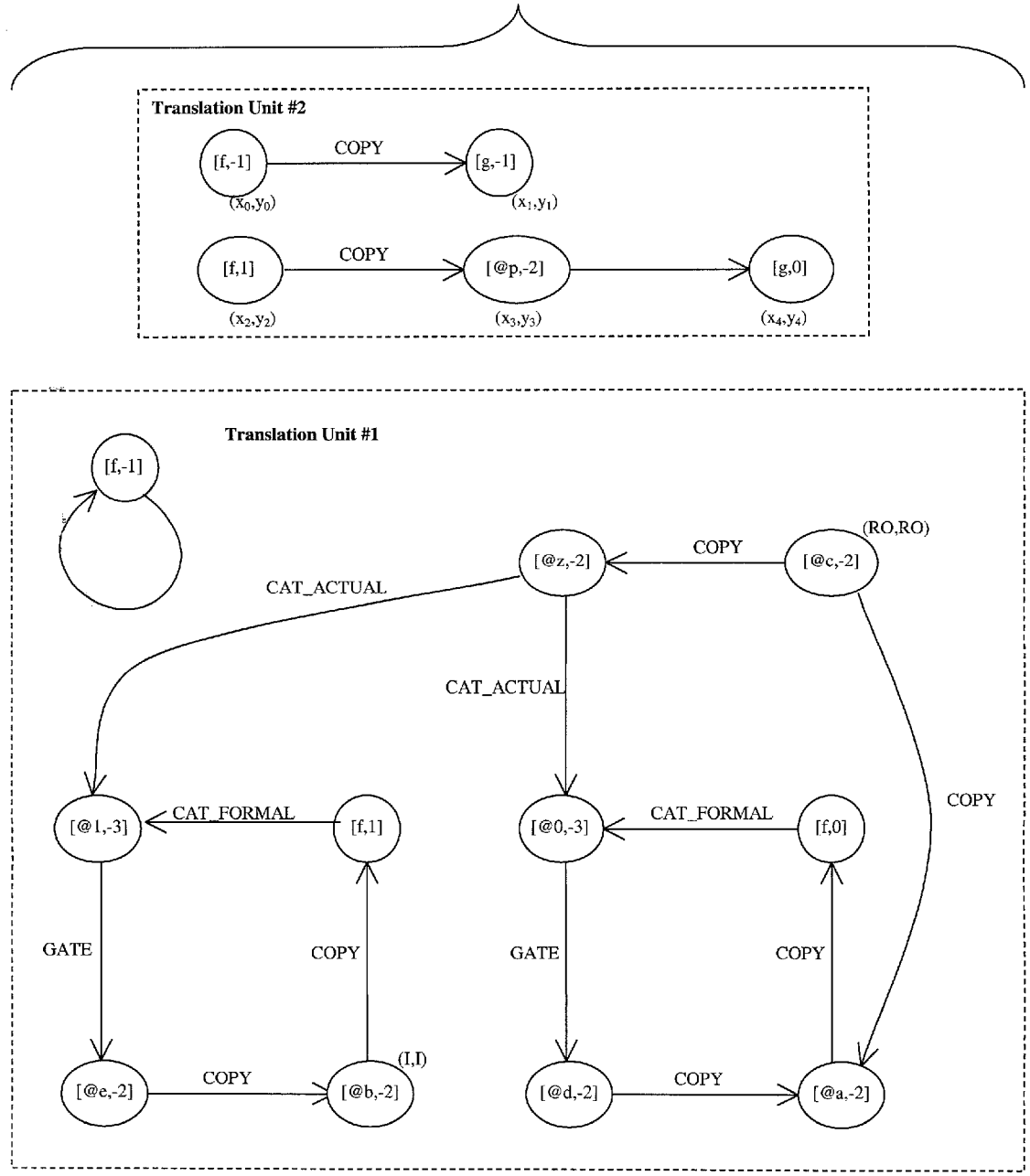
FIG. 12 illustrates a graph corresponding to the program of FIG. 11.
Figure 1:
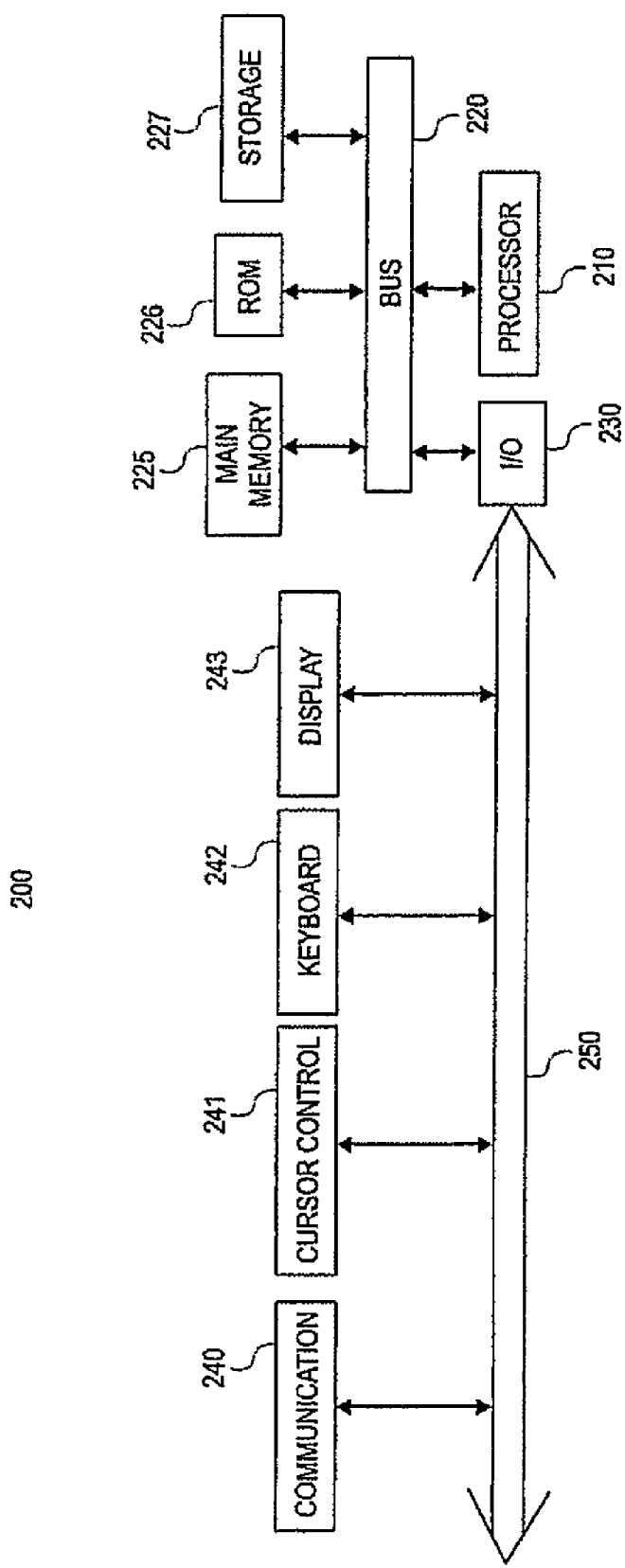
Figure 3:
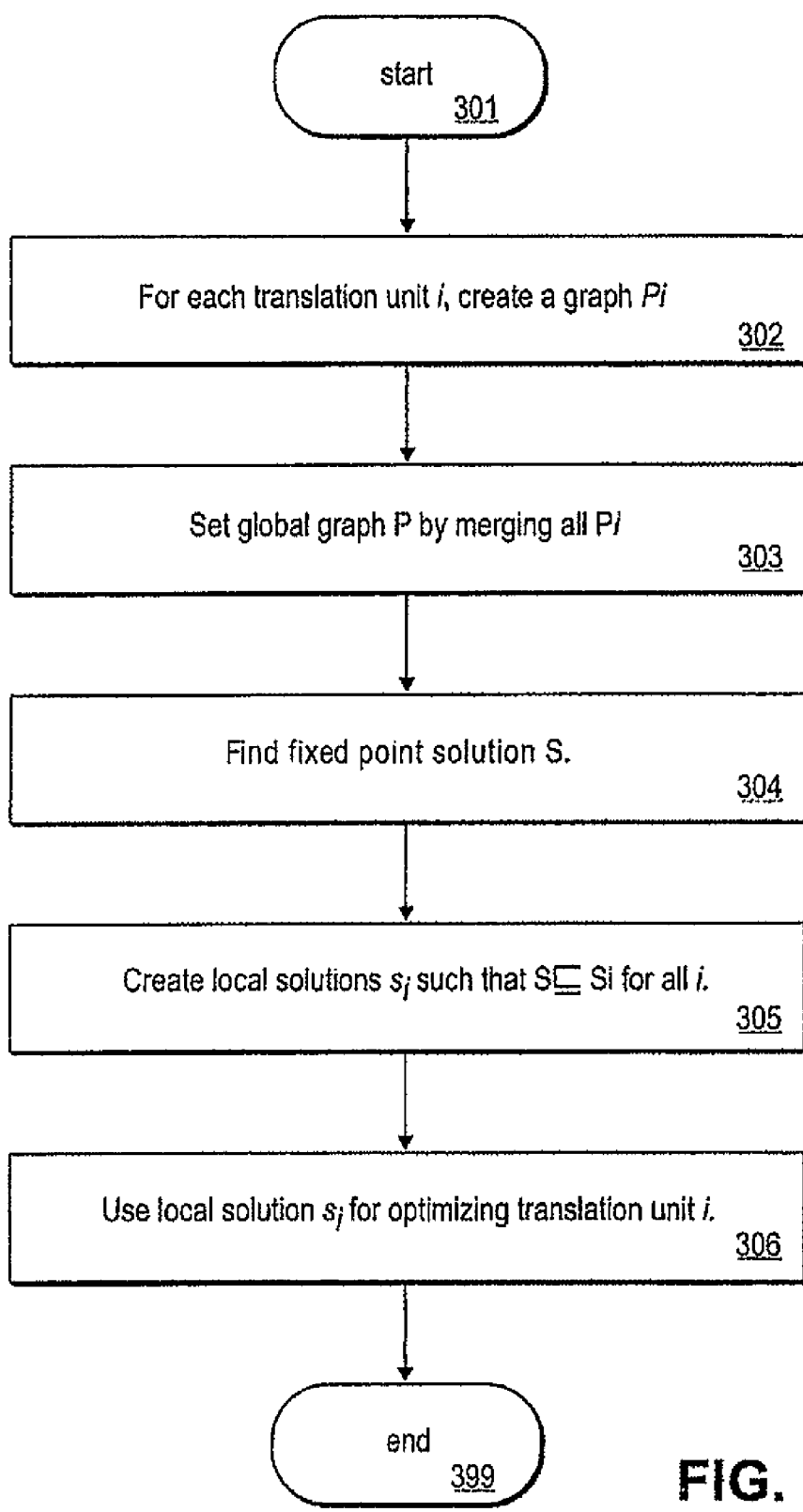

FIG. 11 shows an example program, and FIG. 12 shows the corresponding graph built for it by all the aforementioned rules. Each vertex is shown as a circle with its label inside. The notations for the edges denote their transfer functions FUN. The value of VAL[v] is shown next to each vertex v, unless VAL[v]=(PURE,PURE). The self-loop for vertex [f,-1] 1251 for translation unit #1 1250 arises from the recursive nature of routine f. FIG. 13 is a pair of tables that lists each line of relevant source code and the corresponding actions to the graph.

Once the local graphs for each translation unit are constructed, they can be merged by a global IPA solver and a maximal fixed-point solution found, and the results reported back to local compilations. A fixed-point solution SOL[v] is one in which: SOL[v]⊑VAL[v] for all vertices v and SOL[v]⊑FUN[SOL[u]] for all edges u→v. It's maximal if there is no distinct solution SOL' such that SOL[v]⊑SOL'[v] for all vertices. The interesting parts of the solution to the example in FIGS. 11–13 are shown in the table below, along with their interpretation:

| Vertex | Solution | Interpretation |
| --- | --- | --- |
| [f, -1] | (PURE, PURE) | f has no side effects other than via its parameters |
| [f, -0] | (RO, RO) | f uses zeroth parameter for writes only. Return value is function of zeroth parameter. |
| [f, 1] | (l, l) | f uses firsth parameter for reads only. |
| [g, -1] | (PURE, PURE) | g has no side effects other than via its parameters |
| [g, 0] | (l, l) | g uses zeroth parameter for reads only |

Note that the answer was arrived at with no particular attention to the fact that f is recursive.

A method and system for interprocedural side-effect analysis is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

I claim:

1. A computer-implemented method, comprising:
   analyzing each routine, of a software program having a plurality of separately compilable routines, to create a plurality of local side-effect lattice problems for each routine, a side-effect of a routine being the reading from or writing to a storage by the routine;
   merging the local side-effect lattice problems to create a global side-effect problem;
   computing a global solution to the global lattice problem; and
   splitting the global solution into local solutions for the local side effect lattice problems.

2. The computer-implemented method of claim 1, further comprising:
   determining, for each routine, whether a pointer parameter within the routine is used to write to or read from a storage device.

3. The computer-implemented method of claim 2, further comprising:
determining for each routine whether the pointer parameter is used to derive a return value of the routine.

4. The computer-implemented method of claim 3, further comprising:
computing a lattice value associated with each of the pointer parameters, wherein the lattice value comprises one or more of a return, write, and read effect.

5. The computer-implemented method of claim 4, further comprising:
providing the lattice values to an interprocedural analysis solver to optimize compilation of the software program.

6. The computer-implemented method of claim 5, further comprising:
representing the local side-effect lattice problems as directed graphs having edges and vertices, wherein
each edge has an associated monotone transfer function;
each vertex has a vertex value, wherein the vertex value is one of formal parameter, implicit parameter, local pointer variable, or gate parameter; and
a subset of the vertices is marked with the lattice values.

7. A computer-readable medium having stored thereon a plurality of instructions, said plurality of instructions when executed by a computer, cause said computer to perform:
analyzing each routine, of a software program having a plurality of separately compilable routines, to create a plurality of local side-effect lattice problems for each routine, a side-effect of a routine being the reading from or writing to a storage by the routine;
merging the local side-effect lattice problems to create a global side-effect problem;
computing a global side-effect lattice solution to the global side-effect lattice problem; and
splitting the global side-effect lattice solution into local side-effect solutions for the local side-effect lattice problems.

8. The computer-readable medium of claim 7 having stored thereon additional instructions, said additional instructions when executed by a computer, cause said computer to further perform:
determining, for each routine, whether a pointer parameter within the routine is used to write to or read from a storage device.

9. The computer-readable medium of claim 8 having stored thereon additional instructions, said additional instructions when executed by a computer, cause said computer to further perform:
determining for each routine whether the pointer parameter is used to derive a return value of the routine.

10. The computer-readable medium of claim 9 having stored thereon additional instructions, said additional instructions when executed by a computer, cause said computer to further perform,
computing a lattice value associated with each of the pointer parameters, wherein the lattice value comprises one or more of a return, write, and read effect.

11. The computer-readable medium of claim 10 having stored thereon additional instructions, said additional instructions when executed by a computer, cause said computer to further perform:
providing the lattice values to an interprocedural analysis solver to optimize compilation of the software program.

12. The computer-readable medium of claim 11 having stored thereon additional instructions, said additional instructions when executed by a computer, cause said computer to further perform:
representing the local side-effect lattice problems as directed graphs having edges and vertices, wherein
each edge has an associated monotone transfer function;
each vertex has a vertex value, wherein the vertex value is one of formal parameter, implicit parameter, local pointer variable, or gate parameter; and
a subset of the vertices is marked with the lattice values.

13. A system, comprising:
a processor;
a memory connected to the processor storing instructions for interprocedural side-effect analysis executed by the processor, a side-effect of a routine being the reading from or writing to a storage by the routine;
a storage connected to the processor that stores a software program having a plurality of separately compilable routines;
wherein the processor analyzes each routine, of the software program, to create a plurality of local side-effect lattice problems for each routine;
wherein the processor merges the local side-effect lattice problems to create a global side-effect lattice problem; and
wherein the processor computes a global solution to the global lattice problem and splits the global solution into local solutions for the local side-effect lattice problems.

14. The system of claim 13, wherein the processor determines for each routine, whether a pointer parameter within the routine is used to write to or read from the storage device.

15. The system of claim 14, wherein the processor determines for each routine whether the pointer parameter is used to derive a return value of the routine.

16. The system of claim 15, wherein the processor:
computes a lattice value associated with each of the pointer parameters, wherein the lattice value comprises one or more of a return, write, and read effect.

17. The system of claim 16, wherein the processor:
provides the lattice values to an interprocedural analysis solver to optimize compilation of the software program.

18. The system of claim 17, wherein the processor:
represents the local side-effect lattice problems as directed graphs having edges and vertices, wherein
each edge has an associated monotone transfer function;
each vertex has a vertex value, wherein the vertex value is one of a formal parameter, implicit parameter, local pointer variable, or gate parameter; and
a subset of the vertices is marked with the lattice values.

* * * * *

UNITED STATES PATENT AND TRADEMARK OFFICE
CERTIFICATE OF CORRECTION

| | | |
|---|---|---|
| PATENT NO. | : 7,062,759 B2 | |
| APPLICATION NO. | : 09/839910 | |
| DATED | : June 13, 2006 | |
| INVENTOR(S) | : Robison | |

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheet 1,3 and 4A, and substitute therefor drawing sheet 1-,3 and 4A. (attached)

Signed and Sealed this

Fourth Day of September, 2007

JON W. DUDAS
*Director of the United States Patent and Trademark Office*

(12) United States Patent
Robison

(10) Patent No.: US 7,062,759 B2
(45) Date of Patent: *Jun. 13, 2006

(54) METHOD AND SYSTEM FOR INTERPROCEDURAL SIDE EFFECT ANALYSIS

(75) Inventor: Arch Robison, Champaign, IL (US)

(73) Assignee: Intel Corporation, Santa Clara, CA (US)

(*) Notice: Subject to any disclaimer, the term of this patent is extended or adjusted under 35 U.S.C. 154(b) by 717 days.

This patent is subject to a terminal disclaimer.

(21) Appl. No.: 09/839,910

(22) Filed: Apr. 19, 2001

(65) Prior Publication Data
US 2004/0015903 A1 Jan. 22, 2004

(51) Int. Cl.
G06F 9/45 (2006.01)
(52) U.S. Cl. ............... 717/141; 717/155; 717/151; 717/154; 717/157; 717/141; 717/156
(58) Field of Classification Search ............. 717/159, 717/4, 160, 133, 140–161
See application file for complete search history.

(56) References Cited

U.S. PATENT DOCUMENTS

| | | | |
|---|---|---|---|
| 5,485,616 A * | 1/1996 | Burke et al. ............ | 717/133 |
| 5,671,419 A * | 9/1997 | Carini et al. ............ | 717/145 |
| 5,790,865 A * | 8/1998 | Robison ................. | 717/160 |
| 6,173,444 B1 * | 1/2001 | Archambault ........... | 717/159 |
| 6,427,234 B1 * | 7/2002 | Chambers et al. ....... | 717/140 |
| 6,721,945 B1 * | 4/2004 | Sinha .................... | 717/157 |
| 6,820,253 B1 * | 11/2004 | Robison ................. | 717/141 |
| 2002/0010911 A1 * | 1/2002 | Cheng et al. ............ | 717/4 |

OTHER PUBLICATIONS

Hind et al., Interprocedural Pointer Alias Analysis, Jul. 1999, ACM.*
Cooper et al., Interprocedural Side-Effect Analysis in Linear Time, Jun. 1988, ACM.*
Cooper et al., The Impact of Interprocedural Analysis and Optimization in the Rn Programming Environment, 1986, ACM.*
Cheng et al., A Practical Interprocedural Pointer Analysis Framework, Apr. 1999, Univ. of Illinois.*
Atkinson et al., Effective Whole-Program Analysis in the Presence of Pointers, 1998, ACM.*
Lakhotia, Constructing call multigraphs using dependence graphs, 1993, ACM.*
Liu et al., Eliminating Two Kinds of Data Flow Inaccuracy in the Presence of Pointer Aliasing, 1997, IEEE.*
Harrold et al., Separate Computation of Alias Information for Reuse, 1996, IEEE.*
Boyer et al., Efficient Implementation of Lattice Operations, ACM, 1989.*

(Continued)

*Primary Examiner*—Kakali Chaki
*Assistant Examiner*—Insun Kong
(74) *Attorney, Agent, or Firm*—Blakely, Sokoloff, Taylor & Zafman LLP

(57) ABSTRACT

Interprocedural side-effect analysis is performed by constructing a fixed-point problem graph for each translation unit of a software program having a plurality of separately compilable components. The method performs analyzing each routine, of a software program having a plurality of separately compilable routines, to create a plurality of local side-effect problems for each routine; and merging the local side-effect problems to create a global side-effect problem.

18 Claims, 13 Drawing Sheets

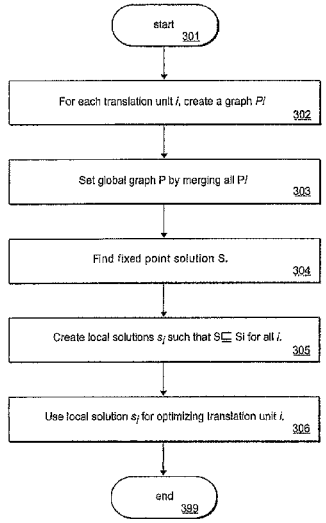

| Function | Function (x,y) |
|---|---|
| 410 — TOP | (PURE,PURE) |
| 420 — COPY | (y,y) |
| 430 — IN_TO_LOST | if $y \leq l$ ⇒ (LOST,LOST)<br>otherwise ⇒ (PURE,PURE) |
| 440 — UNRETURN | if $y$=LOST ⇒ (LOST,LOST)<br>otherwise ⇒ (z,z) where $z = y \sqcup Ol$ |
| 450 — COPY_AND_IN_TO_LOST | if $y \leq l$ ⇒ (LOST,LOST)<br>otherwise ⇒ (y,y) |
| 460 — CAT_FORMAL | (y,PURE) |
| 470 — CAT_ACTUAL | (PURE,y) |
| 480 — GATE | if $x$=LOST ⇒ (LOST,LOST)<br>else if $x<R$ (z,z) where $z = (x \; Ol) \sqcap y$<br>else (z,z) where $z = (x \sqcup Ol)$ |

FIG. 4A